(12) United States Patent
Takenori

(10) Patent No.: US 11,127,973 B2
(45) Date of Patent: Sep. 21, 2021

(54) METHOD FOR MANUFACTURING ALL-SOLID BATTERY

(71) Applicants: Hyundai Motor Company, Seoul (KR); Kia Motors Corporation, Seoul (KR)

(72) Inventor: Hashimoto Takenori, Yokohama (JP)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 124 days.

(21) Appl. No.: 16/542,891

(22) Filed: Aug. 16, 2019

(65) Prior Publication Data

US 2020/0119390 A1 Apr. 16, 2020

(30) Foreign Application Priority Data

Oct. 15, 2018 (JP) .............................. JP2018-194066

(51) Int. Cl.
*H01M 4/02* (2006.01)
*H01M 10/04* (2006.01)
*H01M 10/0585* (2010.01)

(52) U.S. Cl.
CPC ... *H01M 10/0468* (2013.01); *H01M 10/0404* (2013.01); *H01M 10/0585* (2013.01)

(58) Field of Classification Search
CPC ....................................................... H01M 4/02
See application file for complete search history.

(56) References Cited

U.S. PATENT DOCUMENTS

2015/0270585 A1* 9/2015 Sasaoka ............ H01M 10/0468
429/90

FOREIGN PATENT DOCUMENTS

JP 2015-118870 A 6/2015

* cited by examiner

*Primary Examiner* — Jacob B Marks
(74) *Attorney, Agent, or Firm* — Mintz Levin Cohn Ferris Glovsky and Popeo, P.C.; Peter F. Corless

(57) ABSTRACT

A method for manufacturing an all-solid battery is provided to press a laminate of a cell becoming a battery unit at a high pressure, and resin-sealing the peripheral thereof. The method includes disposing a laminate, which includes a plurality of cells composed of an anode, a solid electrolyte, and a cathode, and a current collecting plate having the plurality of cells stacked thereon in series and disposed on both end portions thereof in the stacking direction, into a mold in an opened state. The mold is then closed and the laminate is pressed. A battery unit is formed by press-fitting resin from a resin injection port to solidify the resin in the pressed state of the laminate.

6 Claims, 11 Drawing Sheets

METHOD FOR MANUFACTURING ALL-SOLID BATTERY

CROSS-REFERENCE TO RELATED APPLICATION

This application claims under 35 U.S.C. § 119(a) the benefit of priority to Japanese Patent Application No. 2018-194066 filed on Oct. 15, 2018, the entire contents of which are incorporated herein by reference.

BACKGROUND

(a) Technical Field

The present disclosure relates to a method for manufacturing an all-solid battery and more particularly, to a method for manufacturing an all-solid battery capable of pressing a laminate becoming a battery unit to perform resin-sealing.

(b) Background Art

A method for manufacturing a laminate in a strip shape composed of an anode, a solid electrolytic layer, and a cathode has been developed by roll-pressing a solid electrolytic layer having a release sheet adhered to an anode foil coating compound, likewise roll-pressing a solid electrolytic layer having a release sheet adhered to a cathode foil coating compound, and roll-pressing the solid electrolytic layer to face each other after striping each release sheet.

However, the roll body in a strip shape may cause bending, extrusion, cracking or the like, and even when the roll body is cut into a predetermined cell shape, it is not a flat plate shape. Therefore, even when a plurality of cells are stacked on a container, it is not possible to obtain a sufficient connection state. In addition, since the particles of the solid electrolyte and the electrodes (anode, cathode) are in contact with each other at the interface there between, the contact resistance is substantial. In order to reduce this, the pressing process should beat a high pressure of about 500 MPa, but in a roll press, it may be difficult to press at such a high pressure.

The above information disclosed in this merely section is for enhancement of understanding of the background of the disclosure and accordingly it may contain information that does not form the prior art that is already known in this country to a person of ordinary skill in the art.

SUMMARY

The present disclosure provides a method for manufacturing an all-solid battery capable of pressing a laminate of a cell becoming a battery unit at a high pressure and resin-sealing the periphery thereof.

A method for manufacturing an all-solid battery according to the present disclosure may include disposing a laminate, including a plurality of cells composed of an anode, a solid electrolyte, and a cathode, and a current collecting plate having the plurality of cells stacked thereon in series and disposed on both end portions thereof in the stacking direction, into a mold in an opened state, closing the mold, and pressing the laminate, producing or forming a battery unit by press-fitting resin from a resin injection port to solidify the resin in the pressed state of the laminate, and opening the mold, and removing the battery unit.

The current collecting plate may have a resin cover previously formed on the outer surface thereof in the stacking direction. In the press-fitting the resin, the injection pressure of the resin may be uniformly applied to four side surfaces around the laminate perpendicular to the stacking direction. In press-fitting the resin, a dwelling pressure may be applied to the resin until the resin is hardened. In addition, the injection pressure of the resin may be adjusted to gradually increase.

According to the method for manufacturing an all-solid battery according to the present disclosure, it may be possible to put the laminate composed of a plurality of cells and the current collecting plates at both end portions thereof into a mold, and to close the mold and press the laminate, thereby pressing at an ultra high pressure in the stacking direction by the mold as compared with the roll press. As a result, it may be possible to reduce the interface resistance of the battery unit, and to improve the energy density. Additionally, it may be possible to press-fit resin by pressing the laminate, and to solidify the resin to manufacture the battery unit, thereby covering the periphery of the battery unit with the resin, and not requiring using a metal case. Further, it may be possible for the battery unit to have the structure of stacking a plurality of cells in series, thereby having no the electrode wiring and having a compact shape by saving a space.

It may be possible to previously form the resin cover on the outer surface in the stacking direction of the current collecting plate, thereby reliably covering the upper and lower surfaces of the laminate. It may also be possible to uniformly press the injection pressure of the resin at four side surfaces around the laminate perpendicular to the stacking direction, thereby preventing the thickness of the resin from being uneven.

Additionally, it may be possible to apply the dwelling pressure to the resin until the resin after injection is hardened, thereby preventing any backflow of the press-fitted resin. Generally, the resin is prepared in a compact cylinder, and a predetermined amount is injected into a piston, but the pressed state may be maintained and continued even after the injection by the piston. It may be possible to gradually increase the injection pressure of the resin from 5 MPa initially toward 100 MPa, for example, by the adjustment of increasing gradually, thereby charging the resin even in a narrow gap, and not to apply an abrupt pressure, thereby preventing potential cracks as well.

BRIEF DESCRIPTION OF THE DRAWINGS

The above and other features of the present disclosure will now be described in detail with reference to exemplary embodiments thereof illustrated the accompanying drawings which are given herein below by way of illustration only, and thus are not limitative of the present disclosure, and wherein.

Figure 1:
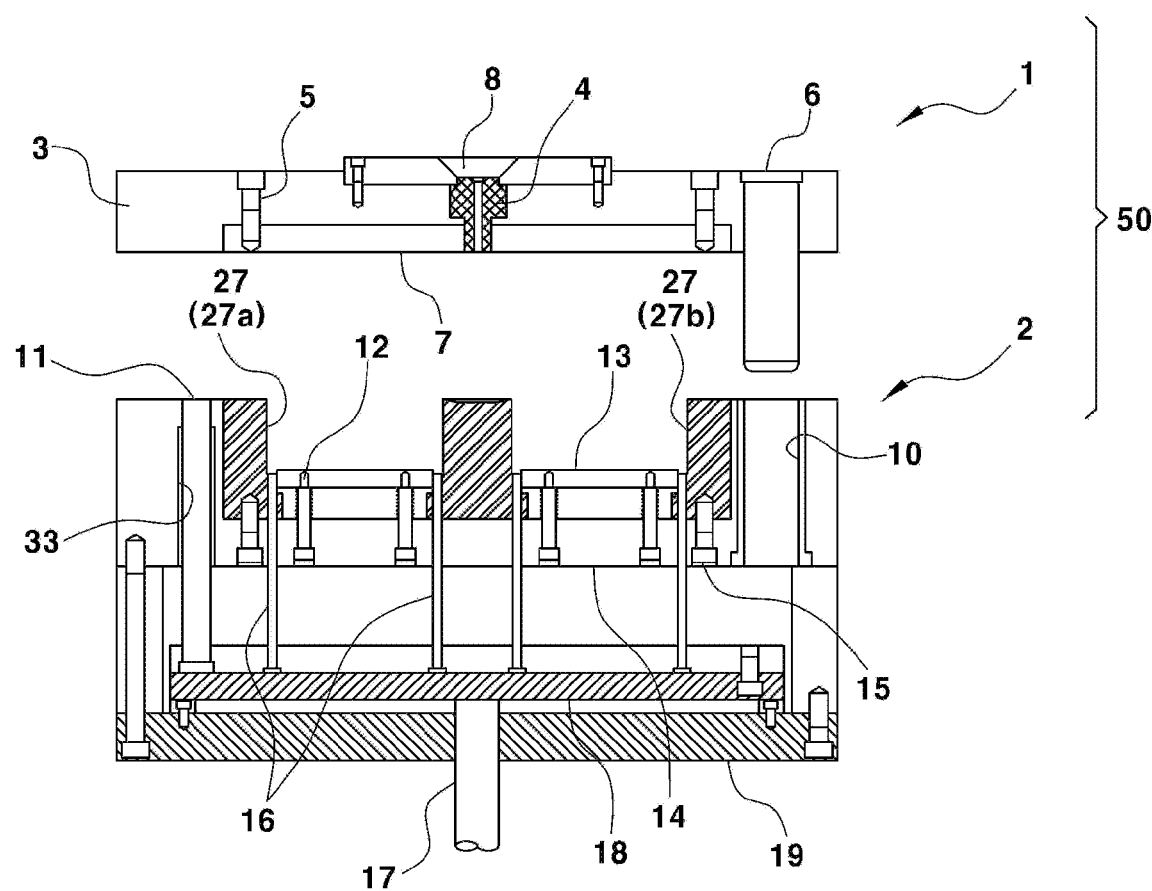
FIG. 1 is a diagram illustrating a method for manufacturing an all-solid battery and opening a mold according to an exemplary embodiment of the present disclosure.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes will be determined in section by the particular intended application and use environment. In the figures, reference numbers refer to the same or equivalent sections of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, a method for manufacturing an all-solid battery according to the present disclosure will be described with reference to the accompanying drawings.

FIGS. 1 to 9 are diagrams illustrating a method for manufacturing an all-solid battery according to the present disclosure. FIG. 1 is a diagram illustrating first opening a mold S1. The mold 50 may be an injection molding mold and may include an upper mold 1 and a lower mold 2. In this exemplary embodiment, the upper mold 1 may be a movable vertically, and the mold 50 may be opened by first lifting the upper mold 1.

The upper mold 1 illustrated in FIG. 1 is configured as follows. An upper base part 3 may be installed with a press plate 7 on the bottom surface side thereof and may be fixed by a fixing pin 5. A guide pin 6 may guide the downward movement of the upper mold 1. A resin injection port 8 and a runner 4 for guiding resin may be installed at the center of the upper mold 1 to inject the resin.

The lower mold 2 illustrated in FIG. 1 is configured as follows. The wall of a recess part 27 may be fixed to a lower base part 14 by a fixing pin 15. The recess part 27 may include a left recess part 27a and a right recess part 27b, and a laminate 25 may be disposed in to each of the left recess part 27a and the right recess part 27b to apply pressure thereto. A pressure receiving plate 13 may be installed on the bottom portion of the left recess part 27a and the bottom portion of the right recess part 27b, and may be fixed to the lower base part 14 by a support pin 12. The guide pin 6 of the upper mold 1 may be engaged with a guide aperture 10 of the lower base part 14.

Additionally, an eject stand 18 may be installed under side of the recess part 27 to be movable vertically. A return pin 11 of the eject stand 18 may guide the movement of the eject stand 18. The return pin 11 may be received in a return pin aperture 33. When the eject stand 18 is lifted, the extrusion rod 16 mounted on the eject stand 18 may be lifted, and the extrusion rod 16 may push the laminate 25 in the left recess part 27a and the right recess part 27b to the upper side of the recess part 27. An eject rod 17 may be installed by passing through the center of a pedestal 19 of the lower base part 14, and when the eject rod 17 is lifted, the eject stand 18 may be lifted.

Figure 2:
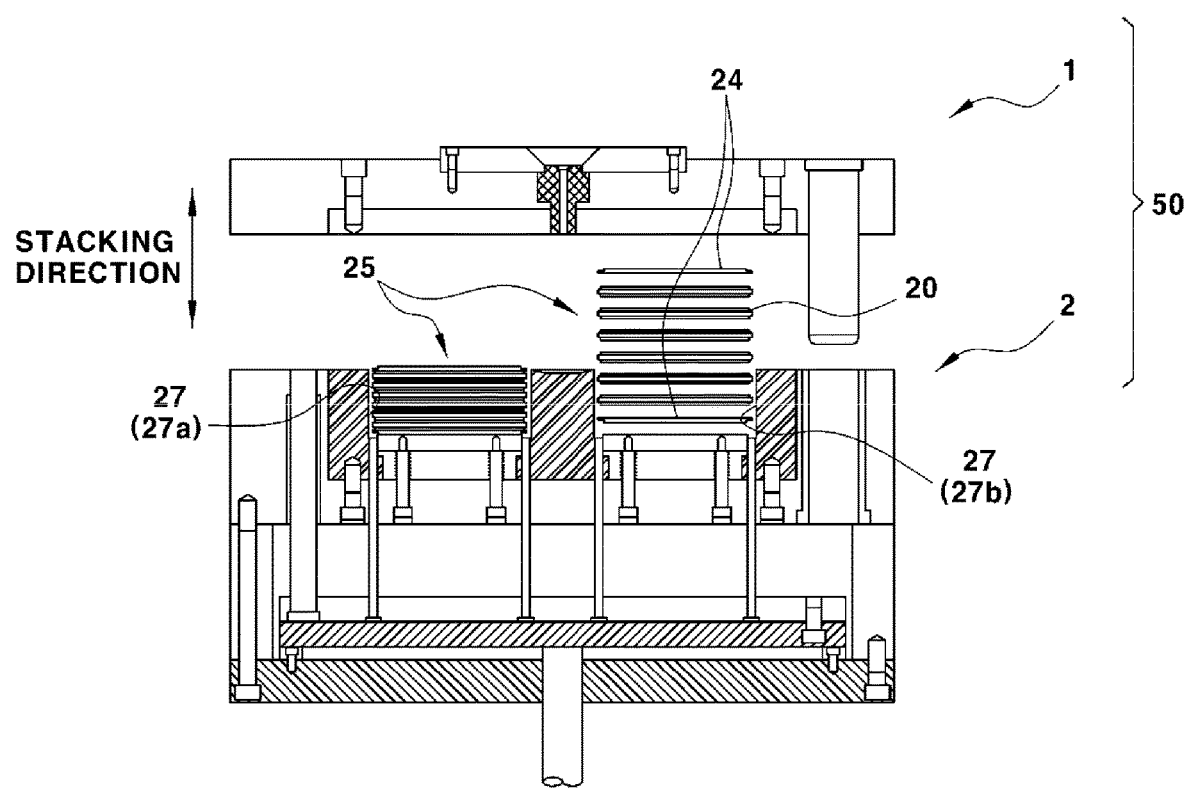
FIG. 2 is a diagram illustrating the method for disposing a laminate composed of a plurality of cells and current collecting plates at both end portions thereof into a left recess part of a mold according to an exemplary embodiment of the present disclosure.
Figure 3:
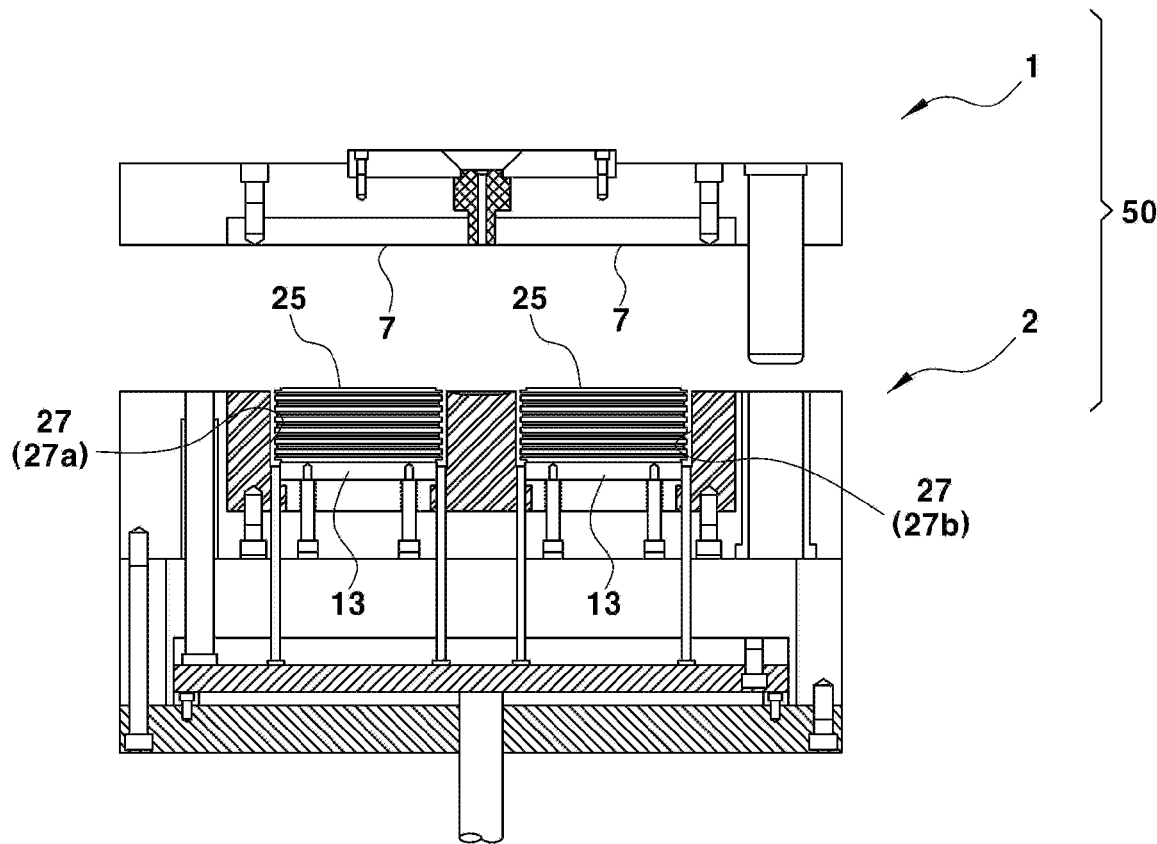
FIG. 3 is a diagram illustrating the method for disposing the laminate composed of the plurality of cells and the current collecting plates at both end portions thereof into a right recess part of a mold according to an exemplary embodiment of the present disclosure.

FIGS. 2 and 3 are diagrams illustrating disposed the laminate 25 including a plurality of cells 20 and current collecting plates 24, 24 at both end portions thereof into the mold 50 S2. The cell 20 may include an anode, a solid electrolyte, and a cathode. Herein, the mold 50 may be installed with the recess part 27 having the left recess part 27a and the right recess part 27b. In the present exemplary embodiment, six laminates 25 may be disposed into the left recess part 27a and the right recess part 27b, respectively.

FIG. 2 illustrates disposing the laminate 25 into the left recess part 27a. In addition, FIG. 2 illustrates that the laminate 25 is being disposed into the right recess part 27b, 27. Since the laminate 25 may be stacked on the upper and lower portions thereof, the stacking direction becomes the vertical direction of the mold 50. Herein, the cell 20 may be a three-layered battery module having an anode, a solid electrolytic layer, and a cathode from the top thereof, and may bean adhesive state not pressed and hardened. Since the cathode of the next cell 20 may be stacked on the anode of one cell 20, the plurality of cells 20 may be stacked in series.

Figure 4:
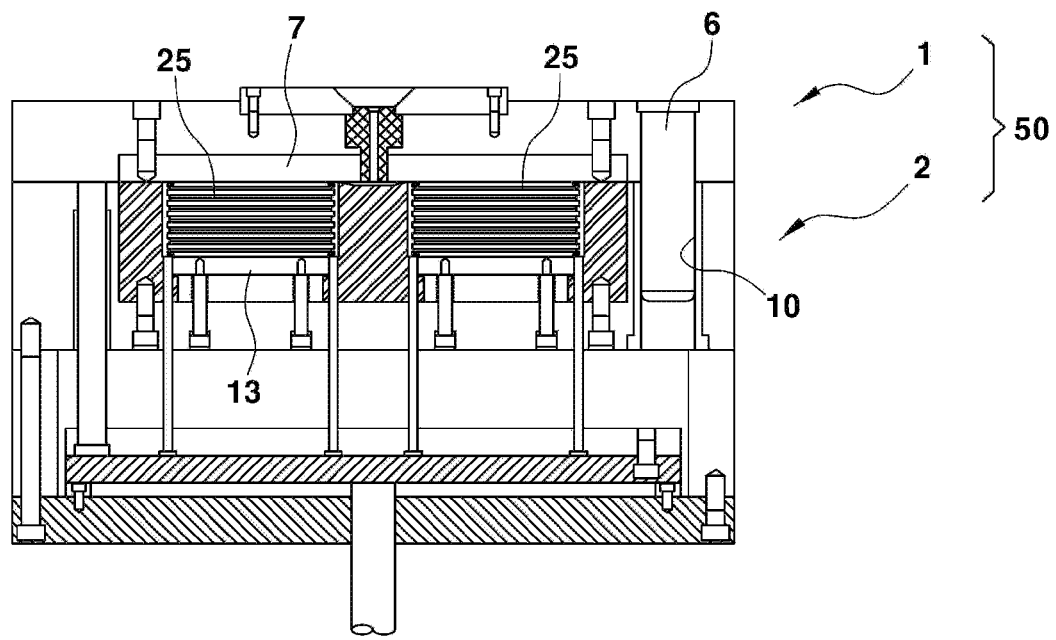
FIG. 4 is a diagram illustrating the method for closing the mold and pressing the laminate according to an exemplary embodiment of the present disclosure.

FIG. 3 is a diagram illustrating disposing the laminate 25 into both the left recess part 27a, 27 and the right recess part 27b, 27. The front, rear, left and right dimensions of the recess part 27 may be greater than the laminate 25 and the recess part 27 may have a gap. FIG. 4 is a diagram illustrating closing the mold 50 and pressing the laminate 25 S3. Since the guide pin 6 of the upper mold 1 may be engaged with the guide aperture 10 of the lower mold 2 and the upper mold 1 closes the upper portion of the lower mold 2, the laminate 25 interposed between the pressure plate 7 of the upper mold 1 and the pressure receiving plate 13 of the lower mold 2 may be pressed. A high pressure of about 500 MPa may be applied thereto.

Figure 5:
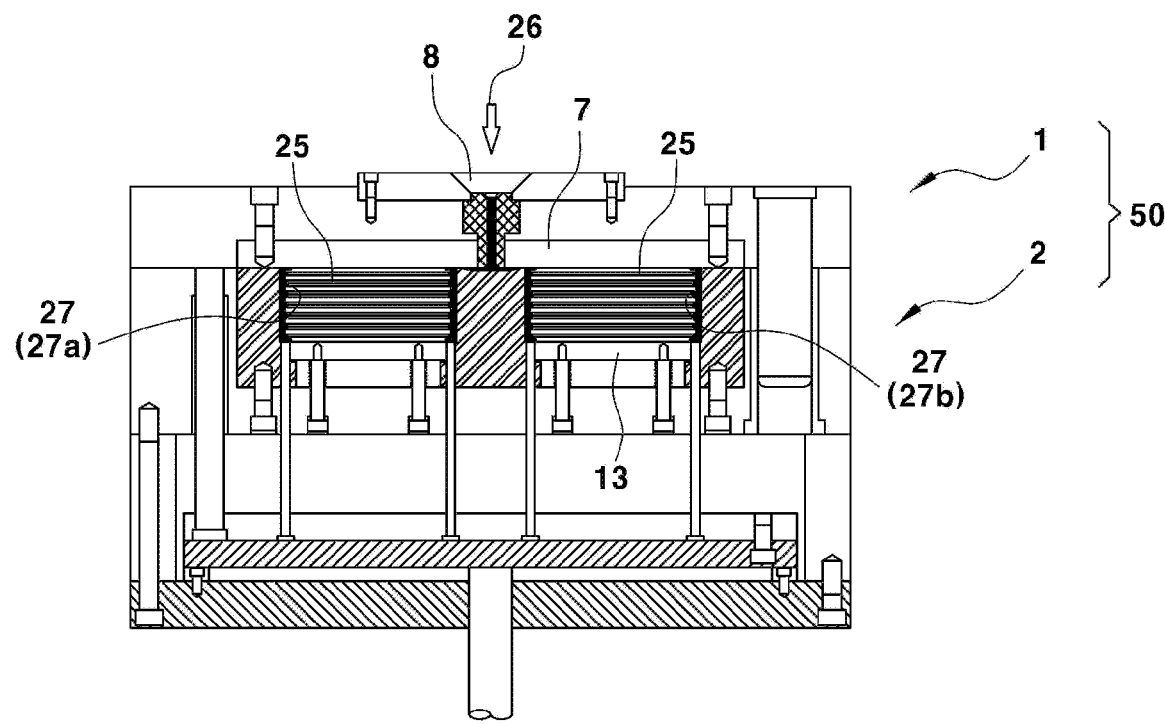
FIG. 5 is a diagram illustrating the method for press-fitting resin from a resin injection port in the pressed state of the laminate according to an exemplary embodiment of the present disclosure.

FIG. 5 is a diagram illustrating press-fitting a resin 26 from the resin injection port 8 in the pressed state of the laminate 25 S4. The resin 26 may pass from the resin injection port 8 through a runner 4 and may be injected to the front, rear, left, and right side surfaces of the laminate 25. The resin 26 may uniformly press the front, rear, left, and right side surfaces of the laminate 25 to charge the resin 26 into the side surface of the laminate 25 and the gap between the recess parts 27. The injection pressure of the resin 26 may start from about 5 MPa, and may gradually increase to about 100 MPa. Even after injection, the dwelling pressure may be applied until the resin is hardened to prevent the resin from flowing backwards.

Figure 6:
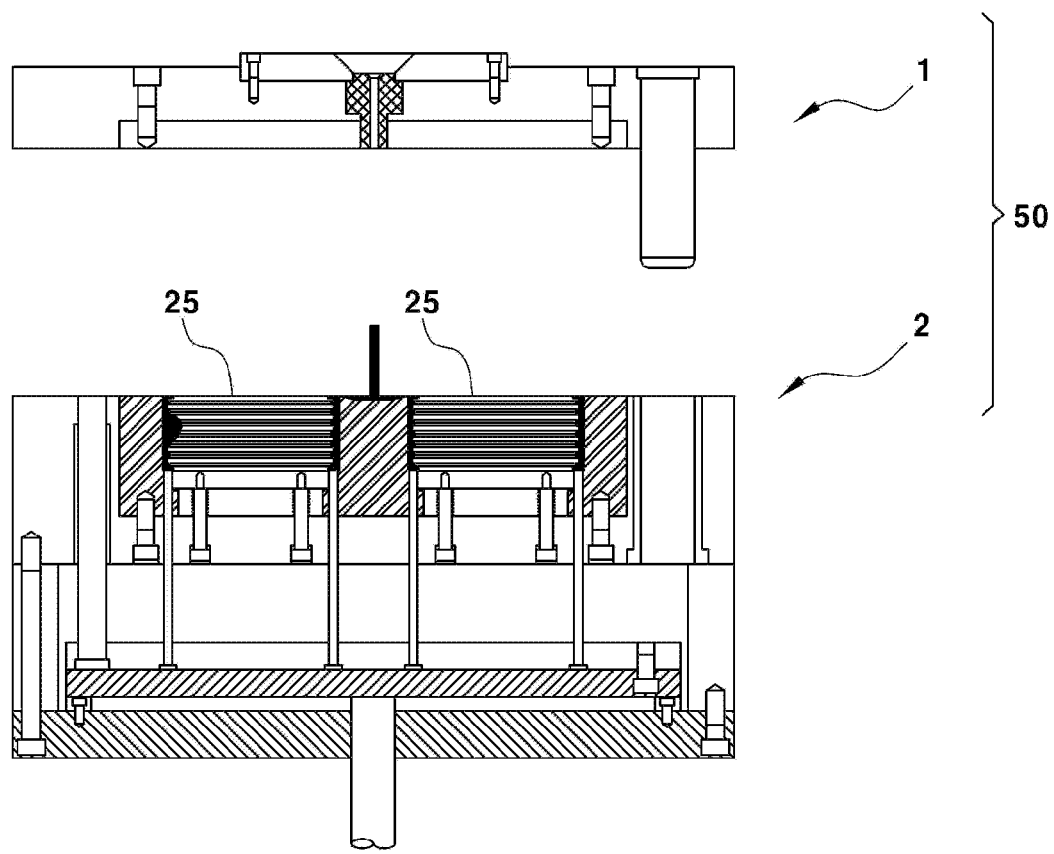
FIG. 6 is a diagram illustrating the method for opening the mold after the resin is hardened according to an exemplary embodiment of the present disclosure.
Figure 7:
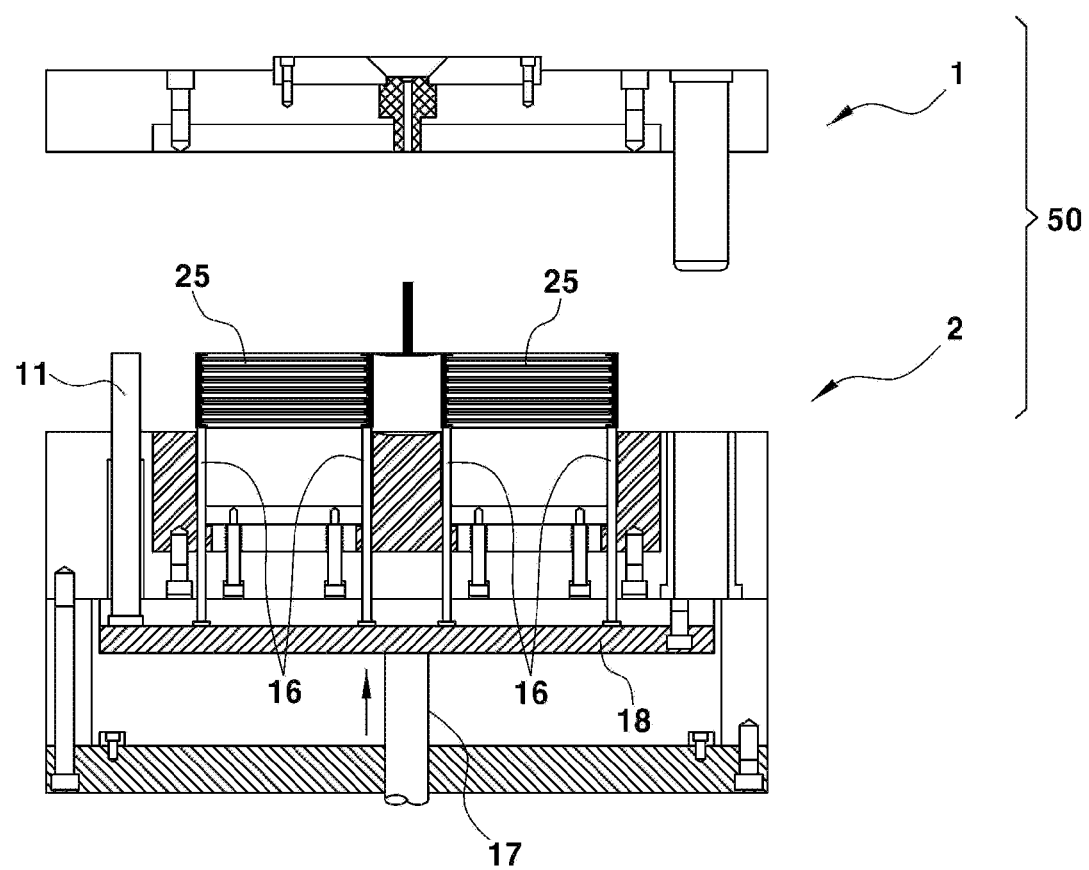
FIG. 7 is a diagram illustrating the method for moving the laminate hardened by the resin to the upper portion of the lower mold by an extrusion rod according to an exemplary embodiment of the present disclosure.

FIG. 6 is a diagram illustrating opening the mold 50 after the resin 26 is hardened S5. The resin remaining in the runner 4 may protrude together with a pin. FIG. 7 is a diagram illustrating moving the laminate 25 hardened with the resin 26 to the upper portion of the lower mold 2 by the extrusion rod 16 S6. The extrusion rod 16 may be mounted on the eject stand 18, and thus, when the eject stand 18 is lifted to an eject rod 17, the extrusion rod 16 may be pushed up, the laminate 25 may be pushed to the upper sides of the left recess part 27a and the right recess part 27b.

Figure 8:
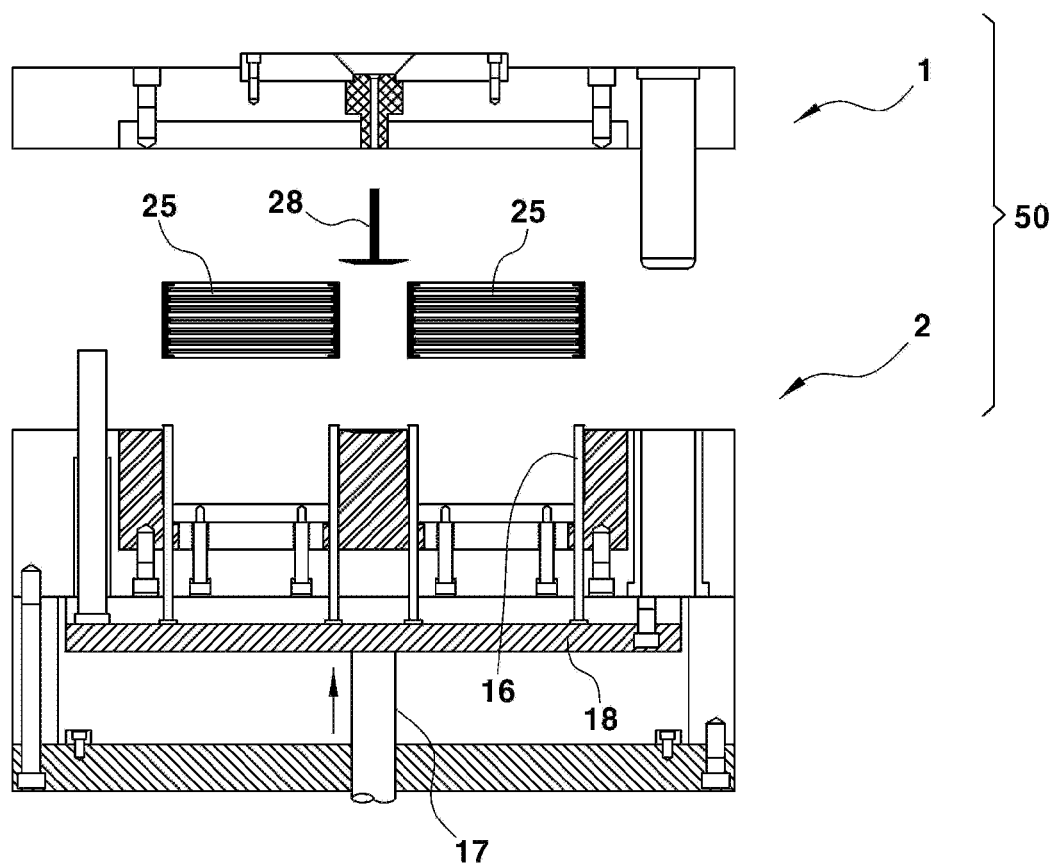
FIG. 8 is a diagram illustrating the method for removing the laminate from the mold and cutting a hot water outlet according to an exemplary embodiment of the present disclosure.
Figure 9:
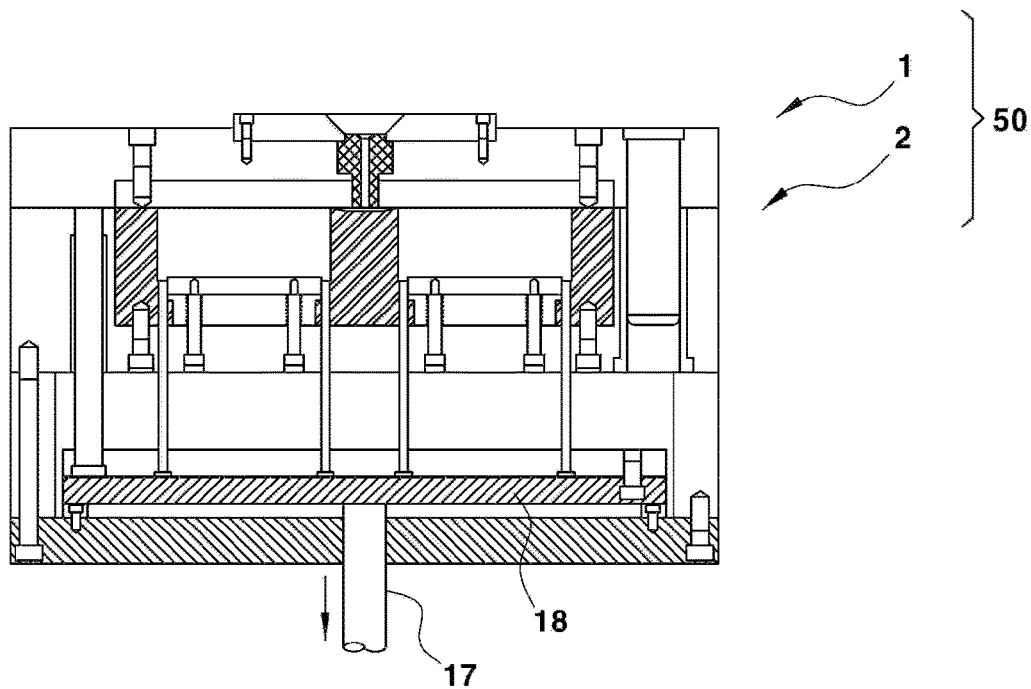
FIG. 9 is a diagram illustrating the method for closing the mold and returning the extrusion rod to the initial state according to an exemplary embodiment of the present disclosure.
Figure 10:
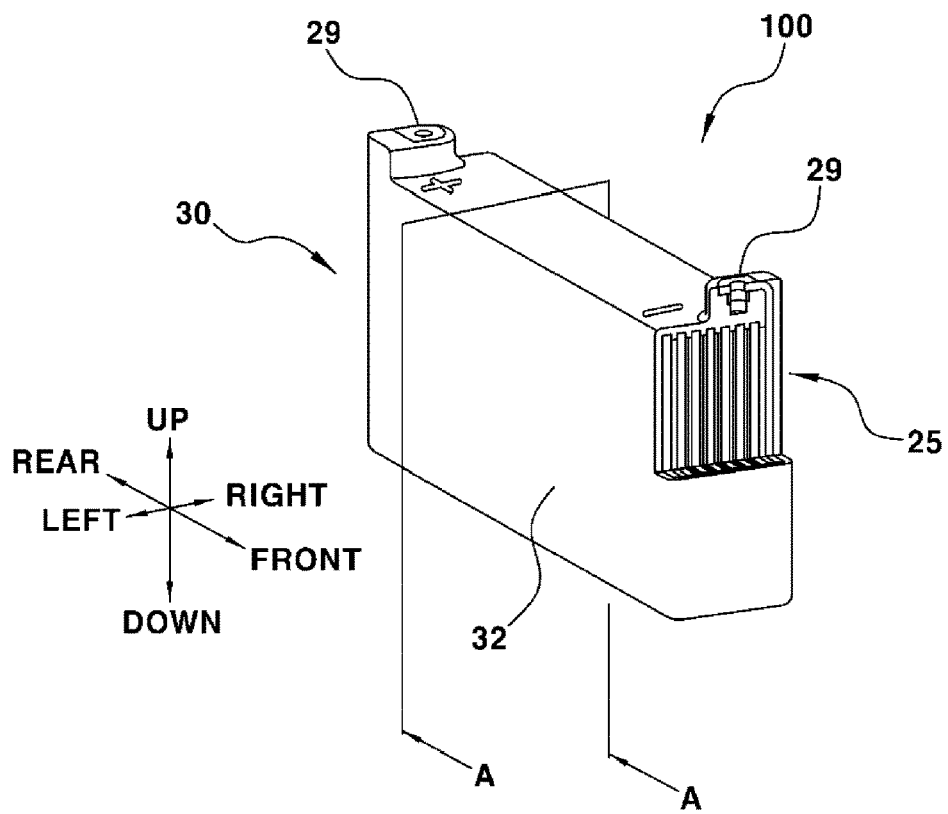
FIG. 10 is a diagram illustrating the exterior of the battery unit manufactured by the method illustrated in FIGS. 1 to 9 according to an exemplary embodiment of the present disclosure.

FIG. 8 is a diagram illustrating removing the laminate 25 from the mold 50 and cutting a hot water outlet 28 S7. FIG. 9 is a diagram illustrating closing the mold 50 and returning the extrusion rod 16 to an initial state S8. FIG. 10 is a diagram illustrating the exterior of the battery unit 100 manufactured by the method illustrated in FIGS. 1 to 9. Particularly, FIG. 10 illustrates cutting a part of the right side thereof. Since a terminal block 29 may be disposed in the upper position, the stacking direction of the laminate 25 becomes vertical.

Further, the battery unit 100 may be entirely covered with a resin case 30. The resin 26 injected from the mold 50 may cover the front and rear side surfaces and the upper and lower side surfaces of FIG. 10. A resin cover 32 may be previously formed on the outer surface of the current collecting plate 24 in the stacking direction. Accordingly, the surface may not draw out the resin of the injection molding from the pressing surface by the mold 50. A first side of the terminal block 29 may be the terminal block of the anode, and a second side thereof may be the terminal block of the cathode. The resin case 30 may include the resin cover 32 previously installed on left and right side current collecting plates and the resin 26 formed by injection molding covering the up, down, front, and rear side surfaces.

Figure 11:
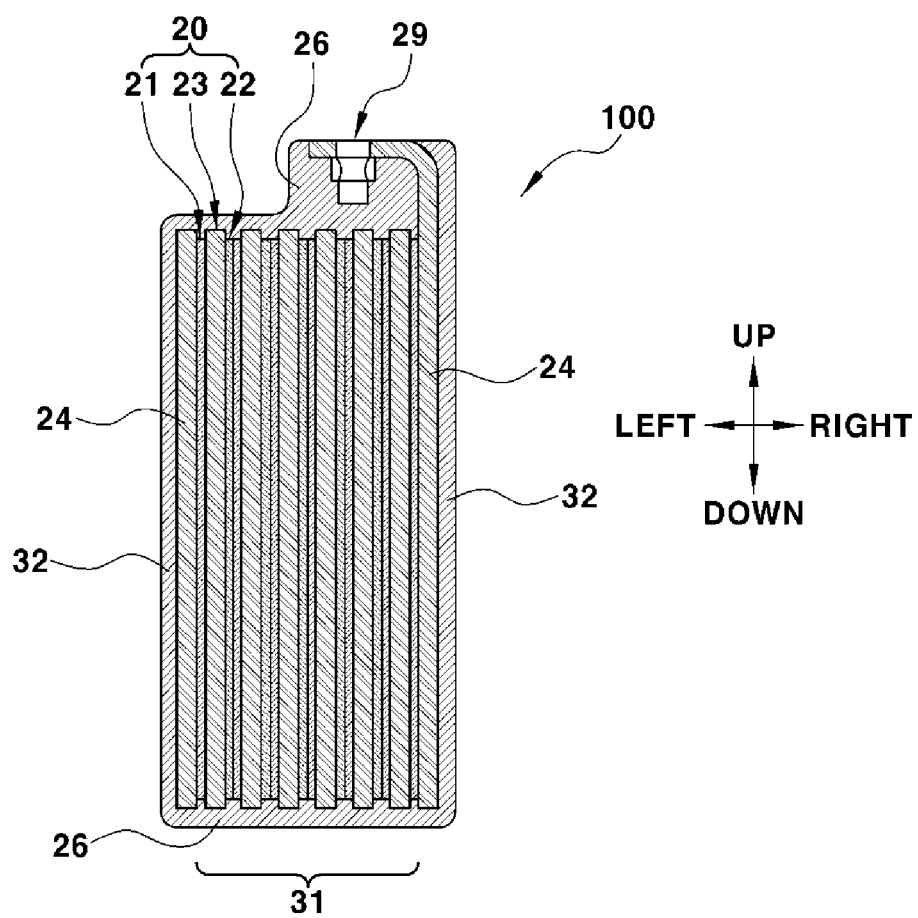
FIG. 11 is a cross-sectional diagram taken along line A-A of FIG. 10 according to an exemplary embodiment of the present disclosure.

FIG. 11 is a cross-sectional diagram taken along line A-A in FIG. 10. The battery unit 100 may be installed with the terminal block 29. In addition, the terminal block 29 may be bent by extending a part of the upper end of the current collecting plate 24, and may include a welding screw mounted at the front end thereof. The cell 20 of the battery may include an anode 21, a solid electrolytic layer 23, and a cathode 22 and the cell 20 of the battery may be a series connection 31.

Figure 12:
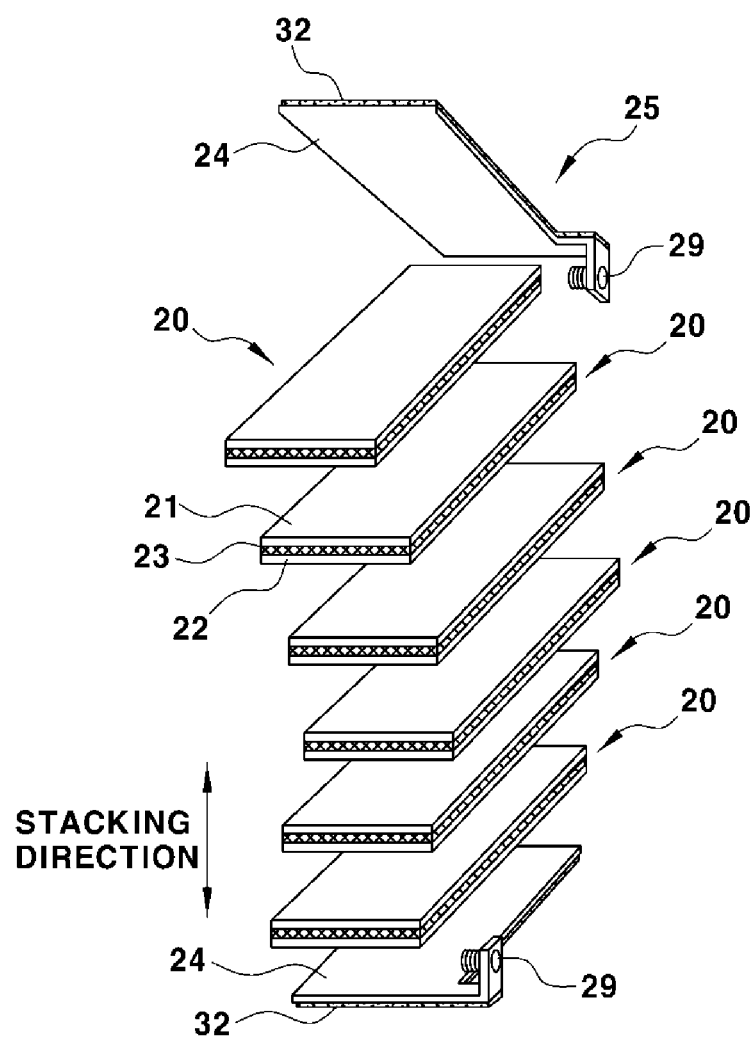
FIG. 12 is a diagram illustrating the staked details of the laminate according to an exemplary embodiment of the present disclosure.
Figure 13:
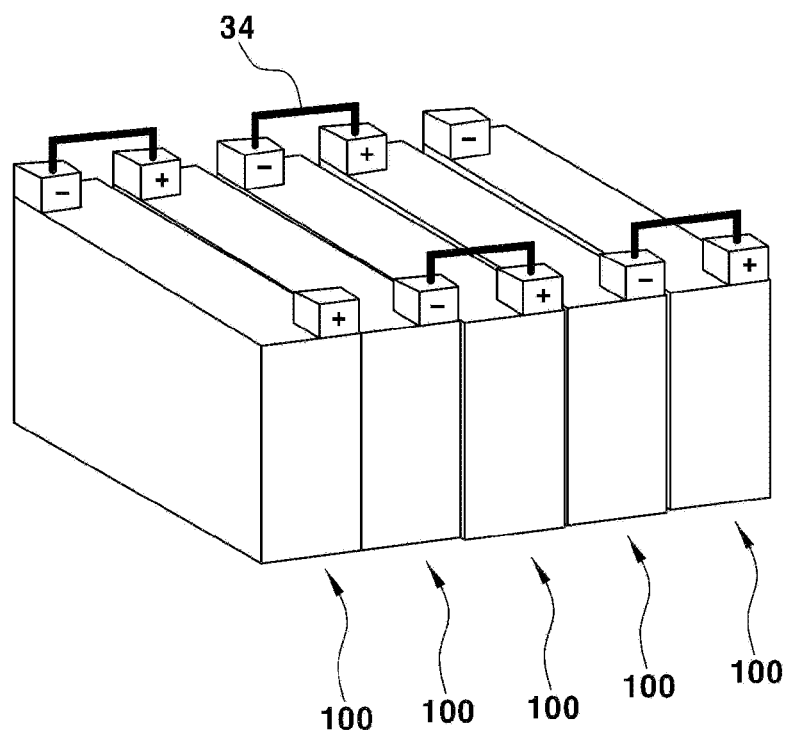
FIG. 13 is a diagram of the all-solid battery connecting a plurality of battery units in series according to an exemplary embodiment of the present disclosure.

FIG. 12 is a diagram illustrating the stacked details of the laminate 25. In particular, FIG. 12 illustrates in the stacking direction as in FIG. 2. The current collecting plate 24 may be installed on the upper end portion and the lower end portion thereof. The resin cover 32 may be previously formed on the outer surface of the current collecting plate 24 in the stacking direction. Further, the resin cover 32 may be formed to be slightly smaller than the dimension of the outer diameter of the current collecting plate 24. As a result, the press-fitted resin 26 may move around each part, such that the resin 26 may be well adhered thereto. The cell 20 of the battery may include the anode 21, the solid electrolytic layer 23, and the cathode 22, and may be connected in series (indicated by reference numeral 31). FIG. 13 is a diagram illustrating the all-solid battery connecting five of the plurality of battery units 100 in series. The terminal block 29 may be connected by a connection tool 34. Although not illustrated in the drawing, the parallel connection of the battery unit 100 is also possible.

The present disclosure is very suitable as the method for manufacturing the all-solid battery capable of pressing the laminate becoming the battery unit and performing resin-sealing using the mold.

What is claimed is:

1. A method for manufacturing an all-solid battery, comprising:
   disposing a laminate, including a plurality of cells composed of an anode, a solid electrolyte, and a cathode, and a current collecting plate having the plurality of cells stacked thereon in series and disposed on both end portions thereof in the stacking direction, into a mold in an opened state;
   closing the mold and pressing the laminate;
   press-fitting resin from a resin injection port to solidify the resin in the pressed state of the laminate and to form a battery unit; and
   opening the mold to remove the battery unit,
   wherein the current collecting plate includes a resin cover previously formed on the outer surface thereof in the stacking direction.

2. The method for manufacturing the all-solid battery of claim 1, wherein in press-fitting the resin, the injection pressure of the resin is applied uniformly to four side surfaces around the laminate perpendicular to the stacking direction.

3. The method for manufacturing the all-solid battery of claim 2, wherein in press-fitting the resin, a dwelling pressure is applied to the resin until the resin is hardened.

4. The method for manufacturing the all-solid battery of claim 3, wherein in press-fitting the resin, the injection pressure of the resin is adjusted to gradually increase.

5. The method for manufacturing the all-solid battery of claim 1, wherein the mold includes an upper mold and a lower mold.

6. The method for manufacturing the all-solid battery of claim 5, wherein the laminate is interposed between a pressure plate of the upper mold and a pressure receiving plate of the lower mold.

* * * * *